United States Patent
Murray et al.

(10) Patent No.: US 6,263,621 B1
(45) Date of Patent: Jul. 24, 2001

(54) LEVELING AND SECURING APPARATUS

(75) Inventors: Thomas R. Murray, Delafield; Paitoon Nimityongskul, Mukwonago; Carmine F. Vara, New Berlin; Randolph N. Wendt, Milwaukee; Gene A. Gruber, Watertown, all of WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/392,005

(22) Filed: Sep. 8, 1999

(51) Int. Cl.[7] .................................................... F16M 13/00
(52) U.S. Cl. ............................ 52/126.5; 52/126.7; 52/512
(58) Field of Search ................................. 52/126.5, 126.6, 52/126.7, 741.1, 512, 698, 704, 506.05; 403/11; 248/500, 680, 231.91

(56) References Cited

U.S. PATENT DOCUMENTS

| | | | |
|---|---|---|---|
| 944,461 | * 12/1909 | Olander | 248/188.4 |
| 2,940,784 | * 6/1960 | Fell | 52/126.5 X |
| 3,361,410 | 1/1968 | Messer . | |
| 5,511,760 | * 4/1996 | Kambara | 248/650 |
| 6,024,330 | * 2/2000 | Mroz et al. | 248/680 X |

FOREIGN PATENT DOCUMENTS 2405368   8/1975   (DE) .

* cited by examiner

Primary Examiner—Janet M. Wilkens
(74) Attorney, Agent, or Firm—Armstrong Teasdale LLP; Christian G. Cabou

(57) ABSTRACT

An apparatus for securing and leveling equipment includes an anchor bolt installed through a center of an aligning device. Vertical and lateral adjustments of the equipment are facilitated. The aligning device includes a hollow adjuster that is threaded within the equipment to raise or lower the equipment. The anchor bolt has clearance for lateral motion within the aligning device and the adjuster is able to tilt at a spherical joint connection with a leveling pad. The location of the anchor assembly in the center of the aligning device facilitates leveling and alignment of the anchored equipment without causing distortion of the equipment and without the use of spacers.

15 Claims, 2 Drawing Sheets

LEVELING AND SECURING APPARATUS

BACKGROUND OF THE INVENTION

This invention relates generally to leveling apparatuses and, more particularly, to an apparatus for securing and leveling equipment and machinery.

Equipment often must be secured to a floor or wall for stability, for seismic reasons or for maintaining alignment with other equipment. In addition to anchoring, some equipment requires adjustment during or after field installation, for instance, to level the equipment or to align the equipment with other equipment.

It is common to align or level equipment using adjusters installed adjacent the equipment anchors. Adjustment in this manner, however, applies torque to the equipment relative to the anchoring. Such torque could distort the equipment. Although spacers or shims are commonly used to control distortion, the exact height of the appropriate spacer or shim is not known before the need for it has arisen. Therefore, a large variety of spacers or shims is kept in inventory.

Accordingly, it would be desirable to eliminate the distortion of anchored equipment resulting from leveling or alignment. It also would be desirable to level or align equipment without having to maintain spacers or shims in inventory.

BRIEF SUMMARY OF THE INVENTION

In one exemplary embodiment of the present invention, a leveling and securing apparatus includes an anchor bolt installed through a center of an aligning device and into a floor. The aligning device includes a hollow adjuster threaded through a section or extension of the equipment. The aligning device also includes a leveling pad positioned on the floor and on which the adjuster rests. The adjuster and leveling pad contact each other with matched spherical surfaces. The anchor bolt is installed through the adjuster and leveling pad and has clearance for lateral motion within the aligning device. The equipment is raised or lowered by threading the adjuster up or down within the equipment. Lateral adjustment of the equipment is facilitated by the freedom of the anchor bolt to move laterally within the aligning device and leveling pad.

The above described leveling and securing apparatus facilitates leveling of equipment without spacers or shims. Also, due to the location of the anchor bolt in the center of the aligning device, anchored equipment is leveled and aligned without distortion of the equipment.

DETAILED DESCRIPTION OF THE INVENTION

Figure 1:
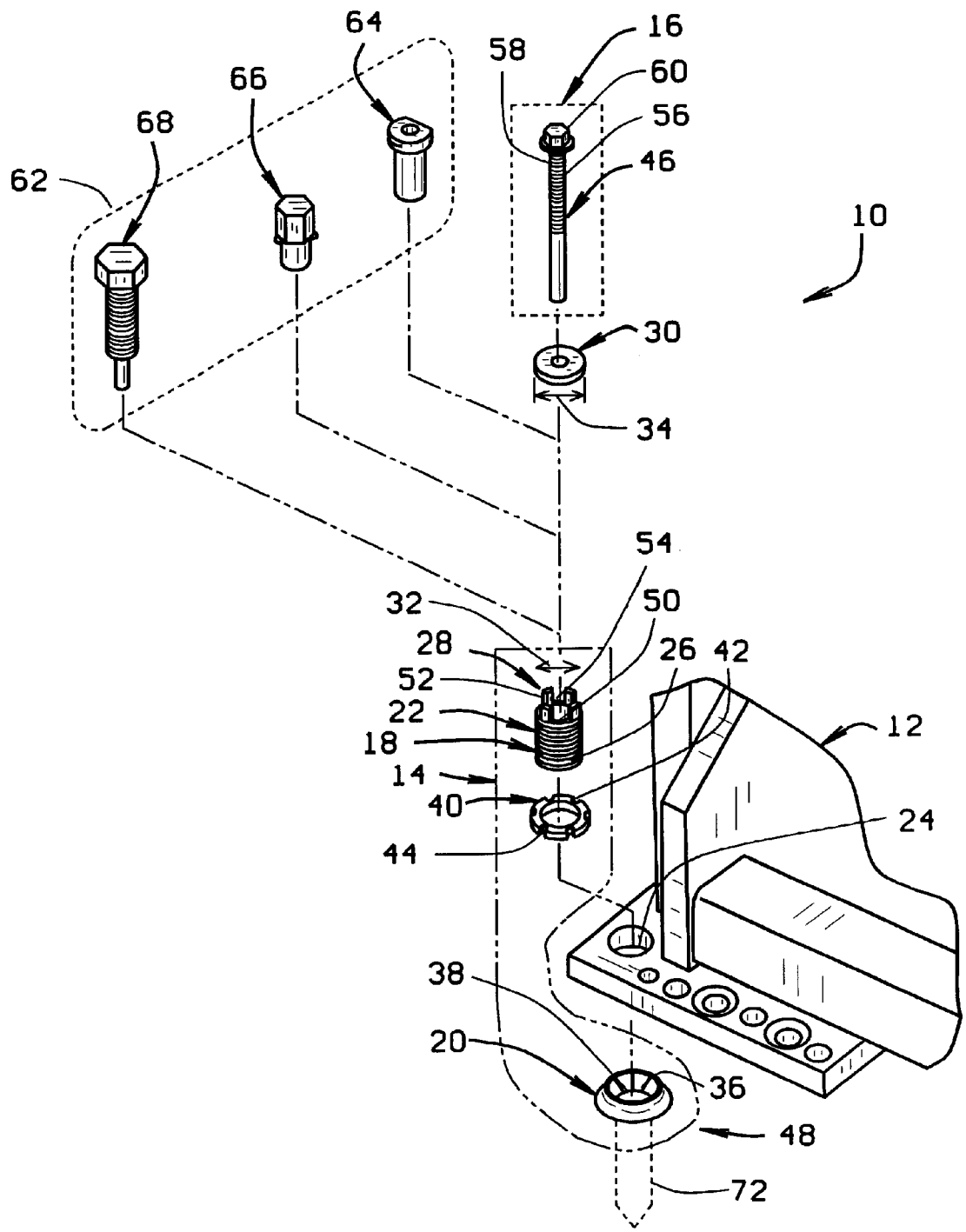
FIG. 1 is an exploded perspective view of one embodiment of a leveling and securing apparatus according to the present invention.

In one embodiment and as shown in FIG. 1, an apparatus 10 for leveling and securing an object or equipment 12 includes an aligning device 14 and an anchor assembly 16 that extends coaxially within aligning device 14. Aligning device 14 includes a hollow adjuster 18 and a leveling pad 20. Adjuster 18 includes a threaded outer surface 22 extending through a threaded opening 24 in equipment 12. Adjuster 18 also includes a beveled bottom 26 and an upper ring of projections 28. A washer 30 rests upon, but is not attached to, upper ring of projections 28. Upper ring of projections 28 includes a projection ring diameter 32 and washer 30 includes a washer diameter 34 that is larger than projection ring diameter 32. Leveling pad 20 is flat-bottomed, annular and includes a central depression 36, into which beveled bottom 26 of adjuster 18 fits to form a spherical joint 38. Aligning device 14 also includes a lock ring 40 including a threaded inner surface 42 that is threaded upon threaded outer surface 22 of adjuster 18. Lock ring 40 also includes a grooved outer surface 44.

Anchor assembly 16 includes an anchor bolt 46 that extends through washer 30, adjuster 18 and leveling pad 20 into a floor or anchoring surface 48. Aligning device 14 includes an interior surface 50 that defines a passage 52 through aligning device 14 and through which anchor bolt 46 extends. Passage 52 has a passage diameter 54 and anchor bolt 46 has a bolt diameter 56 that is smaller than passage diameter 54. Anchor bolt 46 includes a threaded upper portion 58 upon which a nut 60 is threaded. An installation kit 62 includes a drill bushing 64, an adjuster tool 66 and an alignment tool 68.

Figure 2:
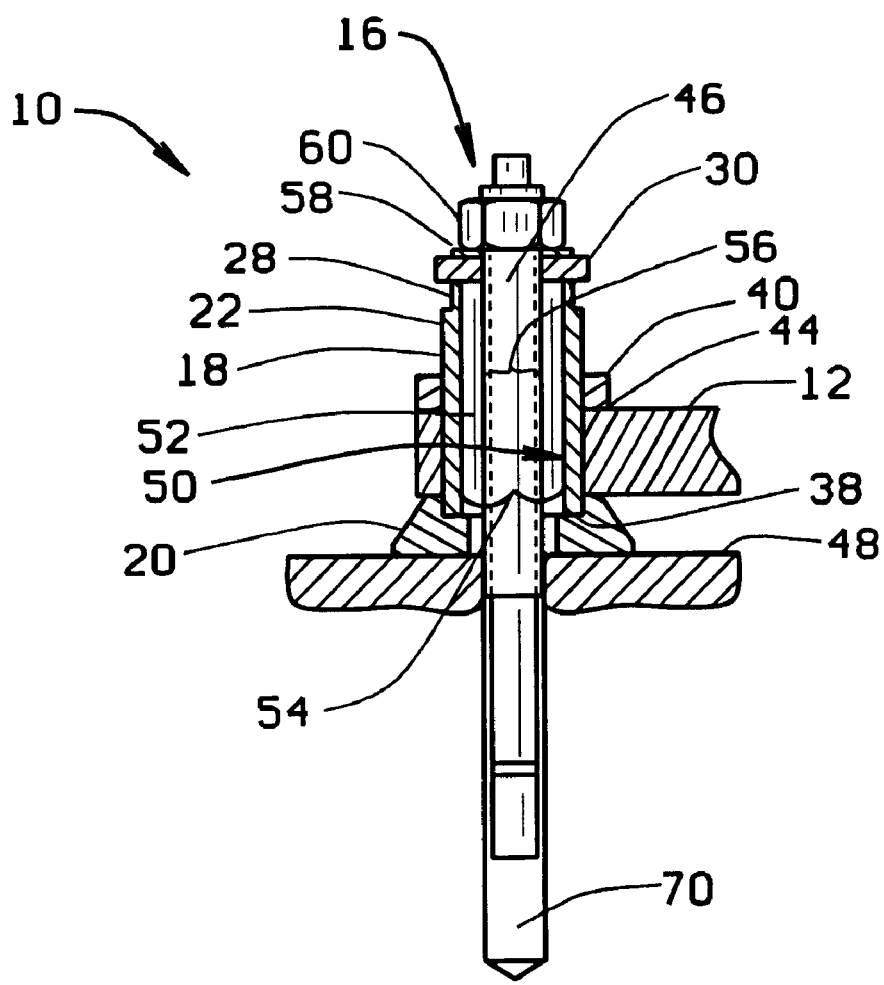
FIG. 2 is an elevational view of the leveling and securing apparatus illustrated in FIG. 1.

Referring to FIG. 2, apparatus 10 is installed and used in the following manner. Leveling pad 20 is placed upon floor 48 and is centered at the location into which anchor bolt 46 is to be installed. Adjuster 18 is threaded through equipment 12 using adjuster tool 66 and is connected to leveling pad 20 at spherical joint 38. Drill bushing 64 is inserted into adjuster 18 to facilitate drilling a hole 70 into floor 48. Washer 30 is installed onto anchor bolt 46 and anchor bolt 46 is inserted through adjuster 18 and leveling pad 20 into floor 48. Nut 60 is threaded on anchor bolt threaded upper portion 58, and anchor assembly 16 is hammered into hole 70. Alignment tool 68 is useful for installation in a corner (not shown) of floor 48 or other location inaccessible to a drill (not shown) after equipment 12 has been put into place. Alignment tool 68 is inserted through adjuster 18 and is used to position equipment 12 over a pre-drilled hole 72 (shown in FIG. 1) in floor 48 for installation of anchor assembly 16.

In use, apparatus 10 allows equipment 12 to be adjusted both vertically and laterally. Vertical adjustment is accomplished by threading adjuster 18 up or down within equipment 12. A spanner wrench (not shown) is applied to upper ring of projections 28 to raise or lower adjuster 18. After vertical adjustment, lock ring 40 is threaded on the threaded outer surface 22 of adjuster 18 and into frictional contact with equipment 12 to maintain adjuster 18 and equipment 12 in their adjusted relative positions. Lock ring 40 is positioned by applying a spanner wrench (not shown) to grooved outer surface 44. Lateral adjustment is facilitated in two ways. Because passage diameter 54 is larger than bolt diameter 56, a degree of lateral movement of equipment 12 is facilitated by the loose fit of anchor bolt 46 within passage 52. Also, spherical joint 38 permits tilting of leveling pad 20 relative to adjuster 18 and equipment 12, thus allowing equipment 12 to be leveled where floor 48 is non-level. Washer 30 moves laterally with anchor assembly 16 while to maintaining anchor assembly 16 at the desired vertical location relative to adjuster 18 and hole 70.

While the invention has been described in terms of various specific embodiments, those skilled in the art will recognize that the invention can be practiced with modification within the spirit and scope of the claims.

What is claimed is:

1. A method for securing and leveling an object utilizing at least one leveling and securing apparatus including an anchor assembly and an aligning device, the aligning device including an adjuster having a threaded outer surface, a lock ring having a threaded inner surface, and a leveling pad configured to be connected to the adjuster by a spherical joint, the aligning device further including an interior surface defining a passage through the adjuster and the leveling pad, the anchor assembly including an anchor bolt for installation through the passage and into an anchoring surface, said method comprising the steps of:

connecting the leveling and securing apparatus to the object;

placing the object in a position to be secured;

installing the anchor bolt through the passage of the aligning device and into the anchoring surface;

threading the adjuster relative to the object; and threadedly engaging the lock ring on the adjuster threaded outer surface to immobilize the adjuster relative to the object.

2. A method in accordance with claim 1 wherein the step of threadedly connecting the adjuster to the object comprises the step of threading the adjuster through the object.

3. A method in accordance with claim 2 wherein the step of threading the adjuster through the object comprises threading the adjuster through the object using an adjuster tool.

4. A method in accordance with claim 1 wherein the step of placing the object in position to be secured comprises the steps of:

placing the leveling pad on the anchoring surface; and resting the adjuster on the leveling pad at the spherical joint.

5. A method in accordance with claim 1 wherein the step of placing the object in position to be secured comprises the step of inserting an alignment tool through the adjuster and into a pre-drilled hole in the anchoring surface.

6. A method in accordance with claim 1 wherein the step of installing the anchor bolt through the passage of the aligning device and into the anchoring surface comprises the step of drilling a hole into the anchoring surface using a drill bushing inserted into the adjuster.

7. A method in accordance with claim 1 wherein the passage through the aligning device allows for movement of the anchor bolt within the passage and further comprising the step of moving the object in a direction approximately parallel to the anchoring surface.

8. An apparatus for securing and leveling equipment, said apparatus comprising:

an aligning device comprising an adjuster configured to connect to a piece of equipment, a leveling pad configured to rest on an anchoring surface and said adjuster resting on said leveling pad at a spherical joint, said adjuster and said leveling pad together comprising an aligning device interior surface defining a passage through said aligning device; and said adjuster comprising an upper ring of projections having a projection ring diameter;

an anchor assembly comprising an anchor bolt extending through said passage; and at least one washer mounted for movement with said anchor assembly and having a washer diameter larger than said projection ring diameter, said anchor bolt positioned through said washer and upper ring of projections.

9. An apparatus in accordance with claim 8 wherein said adjuster comprises a threaded outer surface for threadedly interacting with the equipment.

10. An apparatus in accordance with claim 9 wherein said aligning device further comprises a lock ring comprising a threaded inner surface for threadedly engaging said threaded outer surface of said adjuster.

11. An apparatus in accordance with claim 10 wherein said lock ring further comprises a grooved outer surface.

12. An apparatus in accordance with claim 8 wherein said anchor bolt comprises a bolt diameter and said aligning device interior surface defines a passage diameter greater than said bolt diameter, said passage diameter thereby allowing said anchor bolt to move within said passage.

13. An apparatus in accordance with claim 8 wherein said anchor bolt further comprises a threaded upper portion threadedly engaged by a nut for adjusting said anchor bolt relative to said aligning device and the anchoring surface.

14. An apparatus in accordance with claim 8 further comprising a drill bushing, an adjuster tool and an alignment tool.

15. An apparatus in accordance with claim 8 wherein said spherical joint between said adjuster and said leveling pad is configured to permit tilting of said leveling pad relative to said adjuster and relative to the equipment, for leveling the equipment on a non-level floor surface.

* * * * *

UNITED STATES PATENT AND TRADEMARK OFFICE
CERTIFICATE OF CORRECTION

PATENT NO. : 6,263,621 B1
DATED : July 24, 2001
INVENTOR(S) : Murray et al.

It is certified that error appears in the above-identified patent and that said Letters Patent is hereby corrected as shown below:

Column 2,
Line 58, delete "to".

Signed and Sealed this

Twenty-third Day of July, 2002

Attest:

Attesting Officer

JAMES E. ROGAN
Director of the United States Patent and Trademark Office